United States Patent
Li et al.

(10) Patent No.: US 12,031,051 B2
(45) Date of Patent: Jul. 9, 2024

(54) METHOD OF PREPARING RECYCLABLE AND SELF-REPAIRABLE EPOXY ANTICORROSION COATING

(71) Applicant: Sun Yat-sen University, Guangzhou (CN)

(72) Inventors: Weihua Li, Guangzhou (CN); Ting Shen, Guangzhou (CN)

( * ) Notice: Subject to any disclaimer, the term of this patent is extended or adjusted under 35 U.S.C. 154(b) by 175 days.

(21) Appl. No.: 17/717,240

(22) Filed: Apr. 11, 2022

(65) Prior Publication Data

US 2022/0235241 A1 Jul. 28, 2022

(30) Foreign Application Priority Data

Jul. 30, 2021 (CN) .......................... 202110868027.2

(51) Int. Cl.
C09D 163/00 (2006.01)
C08K 3/04 (2006.01)

(52) U.S. Cl.
CPC .............. C09D 163/00 (2013.01); *C08K 3/04* (2013.01)

(58) Field of Classification Search
CPC ................................ C09D 163/00; C08K 3/04
USPC ....................................................... 524/495
See application file for complete search history.

(56) References Cited

U.S. PATENT DOCUMENTS

2011/0319524 A1* 12/2011 Leibler .................. C08L 63/00
523/400
2014/0141254 A1 5/2014 Araya et al.

FOREIGN PATENT DOCUMENTS

| CN | 103314030 A | 9/2013 |
|---|---|---|
| CN | 104559881 A | 4/2015 |
| CN | 104877523 A | 9/2015 |
| CN | 105505128 A | 4/2016 |
| CN | 106459376 A | 2/2017 |
| CN | 107779003 A | 3/2018 |
| CN | 108440740 A | 8/2018 |
| CN | 110627998 A | 12/2019 |
| CN | 110862722 A | 3/2020 |
| CN | 111154380 A | 5/2020 |
| CN | 112920679 A | 6/2021 |

* cited by examiner

*Primary Examiner* — Edward J Cain

(57) ABSTRACT

A method of preparing a modification-free, recyclable and photothermally-driven self-repairing epoxy anticorrosion coating. A bisphenol A epoxy resin is employed as a film-forming material, and a polybasic acid is used as a curing agent. A carbon material is introduced as a photothermal filler to construct a catalyst-free epoxy-anhydride curing system, which is cured at 110-130° C. for 4-12 h to obtain the recyclable and photothermally-driven self-repairing epoxy anticorrosion coating.

8 Claims, 7 Drawing Sheets

METHOD OF PREPARING RECYCLABLE AND SELF-REPAIRABLE EPOXY ANTICORROSION COATING

CROSS-REFERENCE TO RELATED APPLICATIONS

This application claims the benefit of priority from Chinese Patent Application No. 202110868027.2, filed on Jul. 30, 2021. The content of the aforementioned application, including any intervening amendments thereto, is incorporated herein by reference in its entirety.

TECHNICAL FIELD

This application relates to epoxy anticorrosion coatings, and more specifically to a method of preparing a modification-free, recyclable and self-repairable epoxy anticorrosion coating.

BACKGROUND

Epoxy resin is a typical thermosetting resin, and has been widely used in coating applications owing to its excellent thermal stability, solvent resistance and adhesion ability. Considering that the epoxy resin is a thermoplastic linear monomer before curing, it is often required to undergo cross-linking with a curing agent to form an infusible and insoluble cross-linked network before the actual application, which renders the epoxy resin non-recyclable, thereby causing a considerable consumption of materials.

Epoxy coating is one of the most effective means to prevent metal corrosion, but it may also suffer from cracking damage during the practical use. Those damaged in-service coatings are generally repaired by secondary brushing. Chinese Patent Publication No. 107779003 A discloses a powder coating that can be quickly cured under infrared or sunlight irradiation, which is suitable for the rapid repairing of coating cracks. However, it fails to allow the multiple and repeated repair, and this process will bring large consumption of labor, material resources and financial resources. With the continuous expansion of major infrastructure construction in China, it is increasingly urgent to develop a self-repairable epoxy anticorrosion coating.

Currently, the self-repairing of coatings is enabled mainly through the following three strategies. The first strategy is called "extrinsic self-repairing", in which a repair agent is released to fill the damage when a micro-container pre-embedded in the coating is damaged. This method does no directly enable the "repairability" and "recyclability" of the coating resin, and imposes a great influence on the mechanical property of the coating. The second strategy is called "intrinsic self-repairing", in which a reversible dynamic chemical reaction (such as acylhydrazone bond, disulfide bond and Diels-Alder reaction) is employed to enable the self-repair of polymers. However, this process often requires pre-modification of epoxy monomers, which involves complicated chemical process and high cost. The third strategy is relatively simple, in which by means of the micro "fluidity" or "elasticity", cracks on the damaged interfaces are repaired. This process is often triggered in the presence of light, heat and other factors. As published by Chinese Patent Publication No. 105505128 A, a glass transition temperature ($T_g$) of epoxy resin is regulated by adjusting the proportion of an amine curing agent, such that the epoxy resin exhibits a desired fluidity at a photothermal initiation temperature higher than $T_g$, enabling the self-repair function. Chinese Patent Application No. 202110129093.8 discloses a method for preparing an anticorrosion coating by compounding a silane-modified epoxy monomer with a photothermal filler, and this anticorrosion coating has an enhanced elasticity under the action of photothermal effect, and thus has a self-repairable ability. However, these techniques only achieve the self-repairing of the damaged epoxy coatings, and cannot make the epoxy coatings recyclable.

Therefore, it is necessary to develop a new epoxy coating preparation method, by which a self-repairable and recyclable epoxy coating can be obtained, so as to reduce the consumption of epoxy resins and improve the application value.

SUMMARY

In order to overcome the deficiencies of the prior art, the present disclosure proposes a method for preparing a recyclable and self-repairable epoxy coating without chemical modification. In addition, by means of the incorporation of a photothermal filler, a "simple", "remote" and "precise" thermoplastic solid-liquid transition is enabled by near-infrared (NIR) laser irradiation, allowing for higher application value.

The technical solutions of the present disclosure are described as follows.

This application provides a method of preparing a modification-free, recyclable and photothermally-induced self-repairable epoxy anticorrosion coating, comprising:

(S1) mixing a bisphenol A epoxy resin monomer with an anhydride curing agent uniformly under stirring to obtain a reaction solution;

(S2) dispersing a photothermal filler uniformly in the reaction solution obtained in step (S1) under stirring to obtain a casting solution; and (S3) coating the casting solution on a substrate followed by curing in a temperature range of 110-130° C. for 4-12 h and cooling to obtain the modification-free, recyclable and photothermally-induced self-repairable epoxy anticorrosion coating, wherein within the temperature range of 110-130° C., a curing time is accordingly shortened by 2 h with respect to every 5° C. increase in temperature.

Considering that the epoxy resin is a thermoplastic linear monomer before curing, it is required to undergo cross-linking with a curing agent to form an infusible and insoluble thermosetting product for the practical application. Therefore, the most important essential difference between "thermoplastic" and "thermosetting" materials lies in whether a cross-linking reaction occurs or not, and the internal molecular structure also determines the final property of a material. The epoxy resin monomer has various active groups such as epoxy group, hydroxyl group and ether group, such that it is prone to cross-linking with a wide variety of curing agents, mainly including polyamines and polyacids. The curing temperature required varies depending on the curing agent used. In general, the cross-linking of the epoxy resin with an amine curing agent can occur at a normal temperature, while a higher temperature (>150° C.) is required for those polyacid curing agents (the temperature can be appropriately lowered by adding catalysts such as imidazoles). Considering that the curing conditions play a crucial role in the formation of a cross-linked network structure, the high-temperature curing characteristic of an epoxy-anhydride system in the absence of a catalyst can provide a wide temperature window for adjusting product properties. The traditional "thermosetting" epoxy resin system can be thermoplastically modified by regulating the curing temperature and cycle, so that it has thermoplastic processing characteristics such as thermal melting (solid-liquid transition) similar to those of thermoplastic polymers, rendering the epoxy resin coating "recyclable" and "repairable".

To this end, the present disclosure utilizes the high-temperature curing characteristics of an epoxy-anhydride curing system in the absence of a catalyst, and finds a curing temperature range (110-130° C.) under which the system can be modified to have thermoplasticity in a wide curing window and a relationship between the curing temperature (110-130° C.) and the curing cycle (4-12 h). It has been found that under the curing condition provided herein, only a chain growth reaction between the epoxy monomer and the curing agent occurs in the epoxy-anhydride system, and the chains are entangled with each other instead of cross-linking. Therefore, this curing condition has no effect on the interface properties and barrier properties of the coating. Moreover, the coatings prepared herein have comparable corrosion medium barrier ability to those coatings cured by a traditional technique and a desired surface hardness. Meanwhile, the curing temperature and cycle are highly targeted for the thermoplastic modification of the epoxy resin, and a temperature outside the range disclosed herein cannot reach the thermoplastic modification. Specifically, under a curing temperature lower than 110° C., the cobwebbing will still occur after cooling; and while a temperature higher than 130° C. will lead to excessive curing, which will further directly result in the occurrence of a cross-linked "thermosetting" network, rendering the product "non-recyclable". Furthermore, through the compounding of the epoxy resin with the photothermal fillers, the direct "thermal" triggering can be converted into indirect "light" driving, enabling the simple, remote and precise repair of coatings and allowing for higher application value.

There are a wide variety of epoxy resin monomers, among which, bisphenol A epoxy resin is of the most interest. The epoxy resin of the same type can be further classified according to the relative molecular mass. In an embodiment, the bisphenol A epoxy resin monomer has an epoxy value of 0.38-0.56, and has a molecular structure shown is as follows:

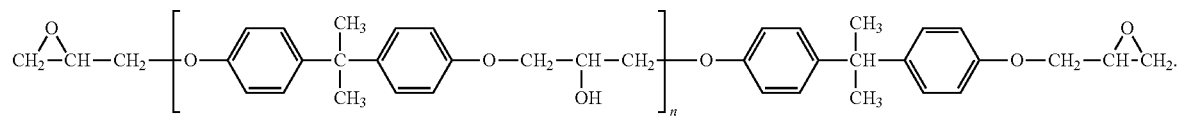

In an embodiment, the bisphenol A type epoxy resin monomer is epoxy resin E54 with an epoxy value of 0.54-0.56, epoxy resin E51 with an epoxy value of 0.48-0.54, epoxy resin E44 with an epoxy value of 0.41-0.47 or E42 epoxy resin with an epoxy value of 0.38-0.45. The domestic and foreign grades corresponding to national standard grades such as E54, E51, E44, and E42 are shown in Table 1.

TABLE 1

Domestic and foreign grades of bisphenol A epoxy resin

| International trade name | China National Bluestar (Group) Co., Ltd. | DIC Synthetic Resins (Zhongshan) Co., Ltd. | Sinopec Baling Petrochemical Corporation | TOHTO Chemical Industry Co., Ltd. | Asahi Denka Co., Ltd. | Mitsui & Co., Ltd. | DOW Chemical Company | CIBA | SHELL | Nan Ya Plastics Corporation |
|---|---|---|---|---|---|---|---|---|---|---|
| E54 | 616 | 840S/ 840 | CYD-127 | YD-127 | EP-4400 | R139 | DER330 | GY240 | 827 | NPEL 127 |
| E51 | 618/ 0164E | 850S/ 850 | CYD-128 | YD-128/ YD-128E/ YD-128CA | EP-4100/ EP-4100E/ EP-4100W | R-140 | DER331 | GY226/ 2600 | 828/ 828 XA/ 828 EL | NPEL 128/ NPEL 128E/ NPEL 128R |
| E44 | 6101 | | CYD-144 | | | R-140Q | DER361 | GY251 | | NPEL 128S |
| E42 | 634 | 860 | | YD134/ YD134N | EP4340 | R144 | DER337 | | 834 | NEPL 134/ NEPL 134L |

In an embodiment, the anhydride curing agent is selected from the group consisting of maleic anhydride, tung oil anhydride, alkenyl succinic anhydride, tetrahydrophthalic anhydride, hexahydrophthalic anhydride, methyl tetrahydrophthalic anhydride, methyl hexahydrophthalic anhydride, nadic anhydride, methyl nadic anhydride, glutaric anhydride, terpene anhydride, methylcyclohexene tetracarboxylic dianhydride and a combination thereof.

In an embodiment, the anhydride curing agent may also be a polyacid curing agent, or a mixture of various curing agents.

In an embodiment, a weight ratio of the anhydride curing agent to the bisphenol A epoxy resin monomer is (0.5-1.1):1, preferably 0.85:1.

The amount of the anhydride curing agent is calculated by the following formula:

$$W = AE \cdot E \cdot K;$$

where W: weight of the anhydride curing agent required per 100 g of epoxy resin, g; AE: molar mass of the anhydride, kg/mol; E: an epoxy value; and K: amount of the anhydride required per molar mass of epoxy group, mol.

In an embodiment, the photothermal filler is selected from the group consisting of carbon particle, amorphous carbon, graphite, carbon nanotube, graphene, graphene-derived material, allotrope thereof and a combination thereof.

In an embodiment, the photothermal filler is 1-6% by weight of a total weight of the bisphenol A epoxy resin monomer and the anhydride curing agent.

In an embodiment, the coating in step (S3) is performed by preheated spraying, brushing, pouring and dip coating.

In an embodiment, in step (S1), the stirring is performed for 0.5-1 h.

In an embodiment, in step (S2), the stirring is performed for 1-2 h, and a vacuum degassing process is performed for 0.5-1 h after the stirring.

In an embodiment, in step (S2), the photothermal filler is fully dispersed in the reaction solution such that no agglomeration of the photothermal filler occurs.

In an embodiment, the substrate is a carbon steel substrate.

Compared to the prior art, the present disclosure has the following beneficial effects.

The epoxy coating preparation method provided herein adopts a bisphenol A epoxy resin as a film-forming material and a polybasic acid as a curing agent, and a carbon material is introduced as a photothermal filler to construct a catalyst-free epoxy-anhydride curing system. The curing system is cured at 110-130° C. for 4-12 h to obtain the modification-free, recyclable and photothermally-induced self-repairable epoxy anticorrosion coating. The present disclosure has the following advantages.

(1) The preparation process is organic solvent-free, and does not produce volatile organic compounds, and thus is environmentally friendly.

(2) The raw materials are all commercially available. A "thermoplastic" epoxy resin material suitable for secondary processing is obtained without any chemical modification. Moreover, the diluted curing agent can be applied in various ways, which is suitable for large scale production.

(3) The repairing process of the coating provided herein is achieved mainly based on a thermal-driven solid-liquid transition of the material, which has advantages of fast and controllable response and various trigger modes such as photothermal, electrothermal and electromagnetic heat, and can achieve the remote in-situ repairing.

(4) The curing conditions proposed herein have no effect on the strong surface stiffness of epoxy resin and an excellent barrier performance for corrosive media, and the coatings prepared herein have comparable anticorrosion performance to the coatings obtained under traditional curing conditions.

DETAILED DESCRIPTION OF EMBODIMENTS

The disclosure will be described completely and clearly below with reference to the embodiments to make the object, technical solutions, and beneficial effects of the present disclosure clearer. The embodiments provided herein are merely illustrative, and are not intended to limit the scope of the present disclosure. In addition, the technical features involved in the embodiments can be combined with each other as long as there is no contradiction.

Unless otherwise specified, the following experiments are all performed by using conventional methods, and the materials and reagents used in the following examples are commercially available.

Example 1

Preparation of Epoxy Anticorrosion Coating

Figure 1:
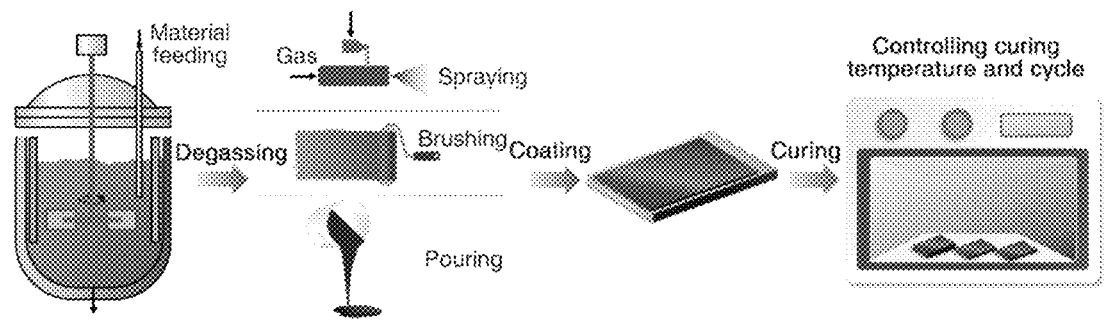
FIG. 1 is a flow chart of a modification-free preparation process of an epoxy anticorrosion coating according to an embodiment of the present disclosure.

Provided herein was a method for preparing an epoxy anticorrosion coating (shown in FIG. 1), which was specifically described as follows.

(1) 2 kg of epoxy resin monomer E44 was fed into a reaction kettle, to which 1.44 kg of a methyl hexahydrophthalic anhydride curing agent was added to produce a mixture. The mixture was stirred at 500 r/min for 1 h to obtain a clear mixing solution.

(2) 170 g of carbon powder was fully dispersed in the reaction solution, stirred at 500 r/min for 2 h, and subjected to vacuum degassing for 0.5 h to obtain a casting solution.

(3) The casting solution was preheated to 130° C., and then sprayed onto a surface of a carbon steel substrate with a nozzle with a diameter of 1 mm to obtain a coating with a thickness of 500 μm, where the spraying was performed at a spraying distance of 15 cm for 15 s. The coating was finally cured in an oven at 130° C. for 4 h, and then naturally cooled to obtain the epoxy anticorrosion coating.

Example 2

Preparation of Epoxy Anticorrosion Coating

Provided herein was a method for preparing an epoxy anticorrosion coating (shown in FIG. 1), which was specifically described as follows.

(1) 2 kg of epoxy resin monomer E51 was fed into a reaction kettle, to which 1.35 kg of a methyl tetrahydrophthalic anhydride curing agent was added to produce a mixture. The mixture was stirred at 400 r/min for 1 h to obtain a clear mixing solution.

(2) 170 g of carbon powder was fully dispersed in the reaction solution, stirred at 500 r/min for 2 h, and subjected to vacuum degassing for 0.5 h to obtain a casting solution.

(3) The casting solution was preheated to 130° C., and then sprayed onto a surface of a carbon steel substrate with a nozzle with a diameter of 1 mm to obtain a coating with a thickness of 500 μm, where the spraying was performed at a spraying distance of 15 cm for 15 s. The coating was finally cured in an oven at 120° C. for 8 h, and then naturally cooled to obtain the epoxy anticorrosion coating.

Example 3

Preparation of Epoxy Anticorrosion Coating

Provided herein was a method for preparing an epoxy anticorrosion coating (shown in FIG. 1), which was specifically described as follows.

(1) 4 g of epoxy resin monomer E44 was fed into a beaker with a volume of 50 mL, to which 2.88 g of a methyl hexahydrophthalic anhydride curing agent was added to produce a mixture. The mixture was stirred at 500 r/min for 1 h to obtain a clear mixing solution.

(2) 0.34 g of graphene was fully dispersed in the reaction solution, stirred at 500 r/min for 2 h, and subjected to vacuum degassing for 0.5 h to obtain a casting solution.

(3) The casting solution was preheated to 130° C., and then sprayed onto a surface of a carbon steel substrate with a nozzle with a diameter of 1 mm to obtain a coating with a thickness of 500 μm, where the spraying was performed at a spraying distance of 15 cm for 15 s. The coating was finally cured in an oven at 110° C. for 12 h, and then naturally cooled to obtain the epoxy anticorrosion coating.

Comparative Example 1

Preparation of Epoxy Anticorrosion Coating using Traditional Curing Method

Provided herein was a traditional curing method for preparing an epoxy anticorrosion coating, which was specifically described as follows.

(1) 2 kg of epoxy resin monomer E44 was fed into a reaction kettle, to which 1.44 kg of a methyl hexahydrophthalic anhydride curing agent was added to produce a mixture. The mixture was stirred at 500 r/min for 1 h to obtain a clear mixing solution.

(2) 170 g of carbon powder was fully dispersed in the reaction solution, stirred at 500 r/min for 2 h, and subjected to vacuum degassing for 0.5 h to obtain a casting solution.

(3) The casting solution was sprayed onto a surface of a carbon steel substrate with a preheated nozzle with a diameter of 1 mm to obtain a coating. The coating was finally cured in an oven at 160° C. for 2 h, and then naturally cooled to obtain the epoxy anticorrosion coating.

Experimental Example 1

Performance Evaluation of Epoxy Anticorrosion Coating (1) Mechanism Analysis

Figure 2A:
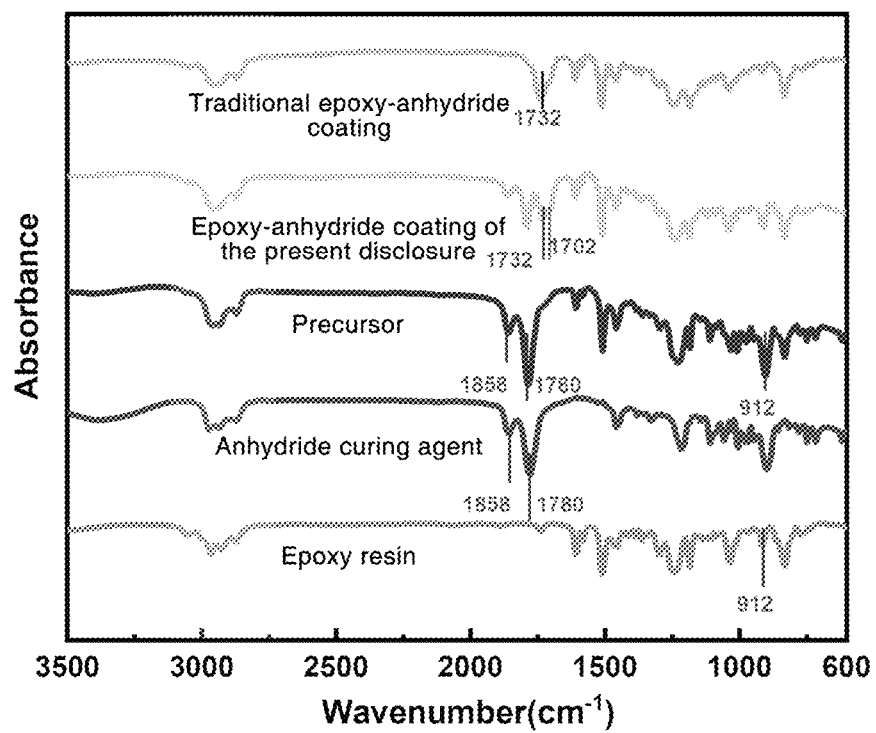
FIG. 2a shows FTIR spectra of E44, MeHHPA, Precursor, Precursor-CNPs, EP-P, EP-P-CNPs, and EP-S-CNPs.
Figure 2B:
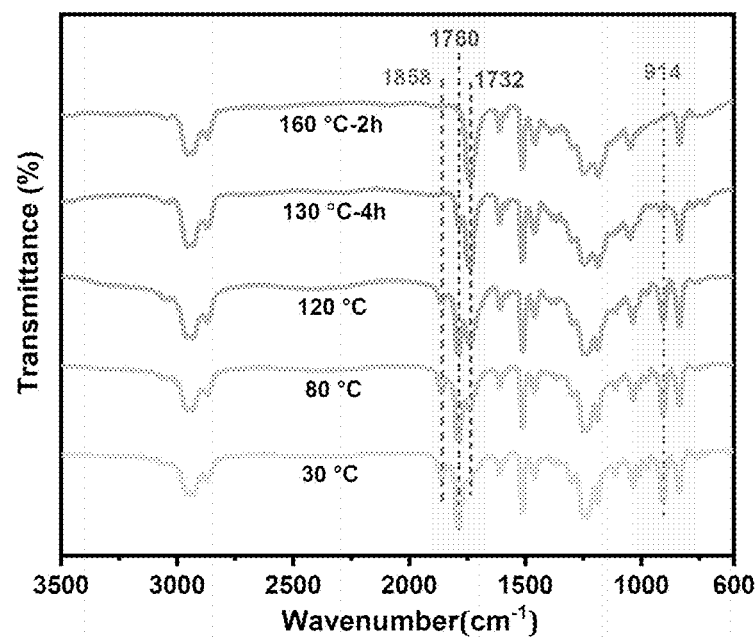
FIG. 2b illustrates time-dependent FTIR spectra of EP-P-CNPs at various temperatures: 30° C., 80° C., 120° C., 130° C., and 160° C., in which data at 130° C. and 160° C. is collected after maintaining for 4 h and 2 h, respectively, referred as 130° C.-4 h, and 160° C.-2 h.

MeHHPA possessed intense bands at 1780, 1858 $cm^{-1}$, and 892 $cm^{-1}$ attributed to the anhydride group, and the absorption at 912 $cm^{-1}$ was assigned to the oxirane group in epoxy (E44) as shown in FIG. 2a. No new absorption peak arose in the reacted mixture (Reac Mix). The characteristic absorption peaks of MeHHPA (1780 $cm^{-1}$ and 1858 $cm^{-1}$) coexisted with an arising peak at 1732 $cm^{-1}$ assigned to the ester group in the thermoplastic epoxy-anhydride systems, while only the peak at 1732 $cm^{-1}$ appeared in the thermosetting sample, indicating the difference in curing degree. The band at 1702 $cm^{-1}$ corresponded to the unreacted carboxylic groups of MeHHPA. The evolution of the abovementioned peaks at 1732 $cm^{-1}$, 1780 $cm^{-1}$, and 1858 $cm^{-1}$ demonstrated the same process as revealed by the temperature-dependent FTIR spectra (FIG. 2b). According to the FTIR results, a staged reaction mechanism based on different curing temperature windows (130° C. and 160° C.) can be identified. At the first stage (130° C.), the anhydride experienced the ring-opening reaction triggered by hydroxyl groups and then formed polymer chains by reacting with epoxy groups at E44. At the second stage (160° C.), the esterification reaction of the secondary hydroxyl group and the terminal carboxyl group between EP-MeHHPA chains occurred alternately and formed a crosslinking network. Under this mechanism, the linear chains in thermoplastic composites were formed and entangled instead of crosslinked at room temperature (solid-state). After reaching the $T_g$ or melting temperature ($T_m$), the composite turned from the solid state to the fluid state.

(2) Thermal Reversibility Test

Figure 3A:
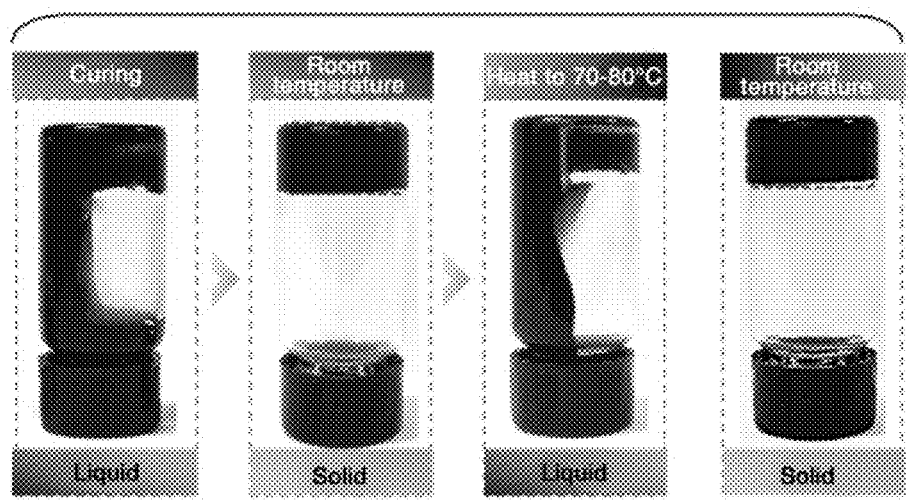
FIGS. 3a-3b shows thermal reversibility test results of epoxy anticorrosion coatings, where 3a: the epoxy anticorrosion coating prepared in any one of Examples 1-3; and 2b: an epoxy anticorrosion coating in Comparative Example 1.
Figure 3B:
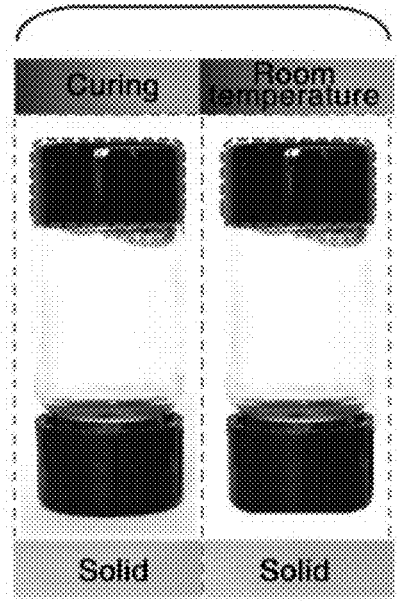

The epoxy anticorrosion coatings prepared in Examples 1-3 and Comparative Example 1 were tested for the thermal reversibility. It was demonstrated by FIGS. 3a-3b that the epoxy coatings prepared in Examples 1-3 can be converted into liquid after being secondarily heated to 70-80° C., similar to a thermoplastic polymer; while the epoxy coating prepared in Comparative Example 1 remained solid after the reheating. The results proved that the anticorrosion epoxy coating prepared by the method of the present disclosure had a superior thermal reversibility.

(3) Recyclability Test

Figure 4:
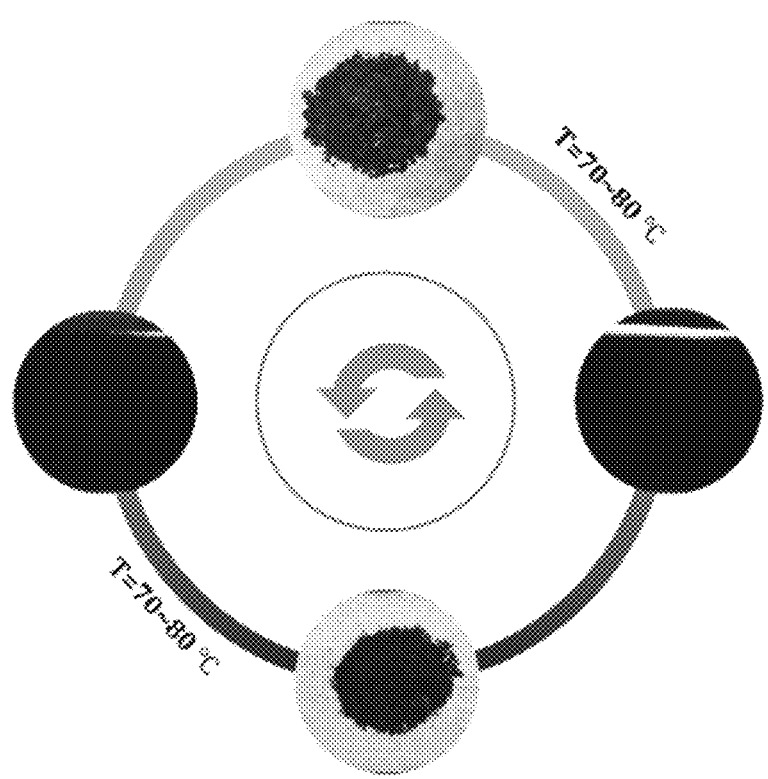
FIG. 4 shows a recyclability of the epoxy anticorrosion coating prepared by the method according to an embodiment of the present disclosure.

The epoxy anticorrosion coatings prepared in Examples 1-3 were scraped into powder, and placed at 70-80° C. for reheating. The powder transformed from solid to liquid to spread onto the surface of the substrate to form a coating again. The results (as shown in FIG. 4) proved that the epoxy anticorrosion coating prepared by the method of the present disclosure was recyclable.

(4) Self-Repairing Test

Figure 5A:
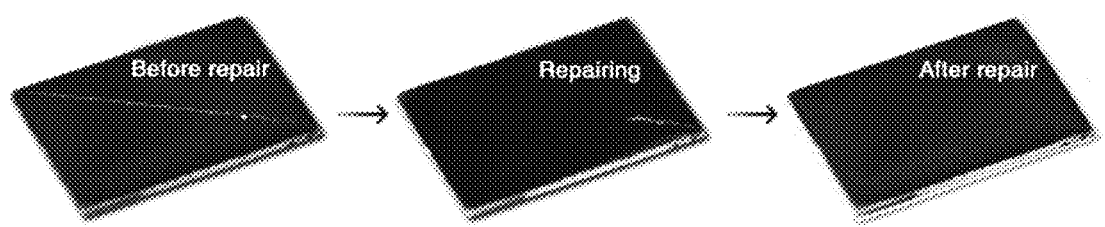
FIG. 5a is an actual picture of the epoxy coating during the repair process.
Figure 5B:
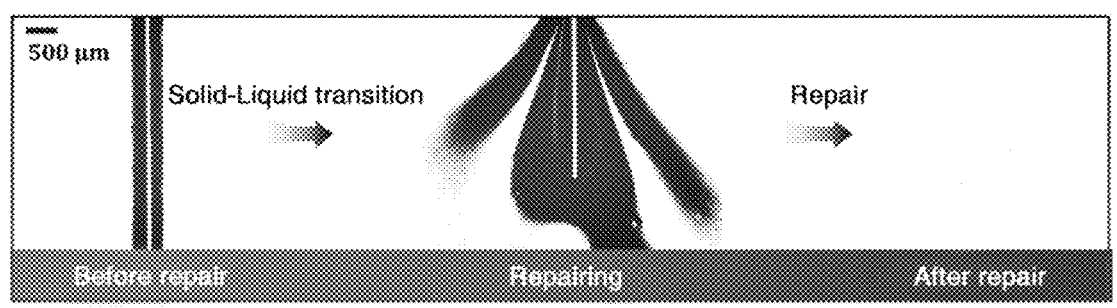
FIG. 5b is a micrograph of the epoxy coating during the repair process.

A crack with a width of 550 μm was artificially created on the epoxy coating prepared by the method of the present disclosure, and then a 1.5 W near-infrared laser with a wave length of 808 nm was used to irradiate the crack. As shown in FIG. 5, without long-term irradiation, the repairing process occurred immediately after irradiation, and the coating at the crack underwent a solid-liquid transformation and flowed with a movement of the laser, so as to heal the crack.

(5) Electrochemical Performance Test

Figure 6A:
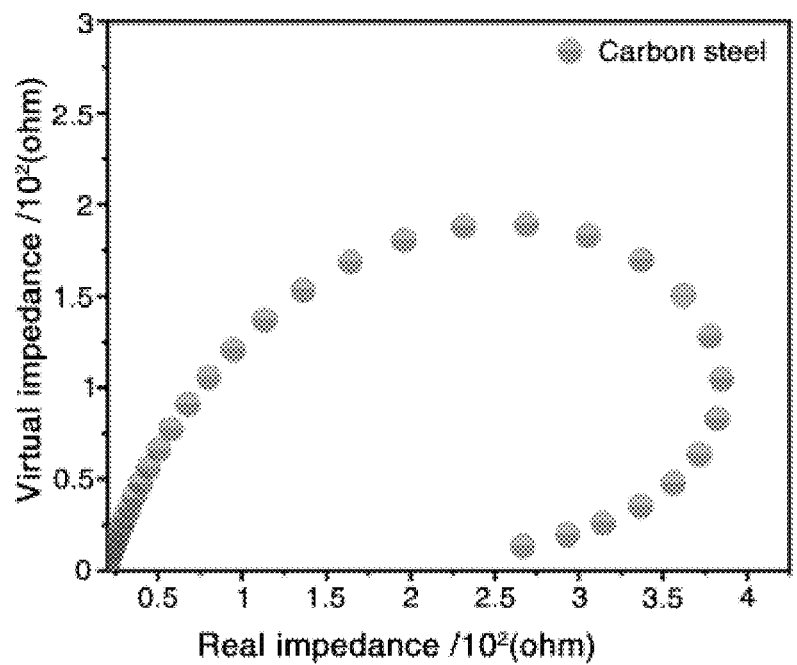
FIG. 6a is a Nyquist electrochemical impedance spectrum of a carbon steel substrate.
Figure 6B:
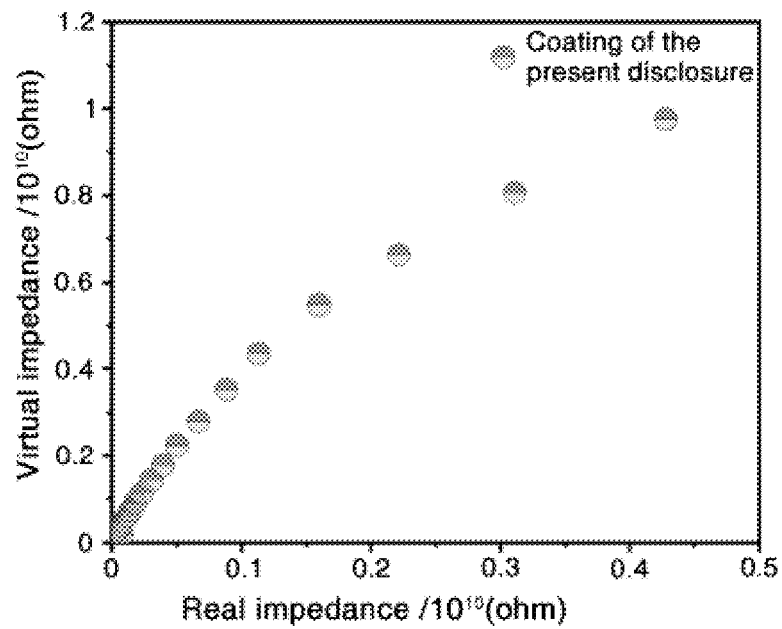
FIG. 6b is a Nyquist electrochemical impedance spectrum of an epoxy coating prepared in Example 1.
Figure 6C:
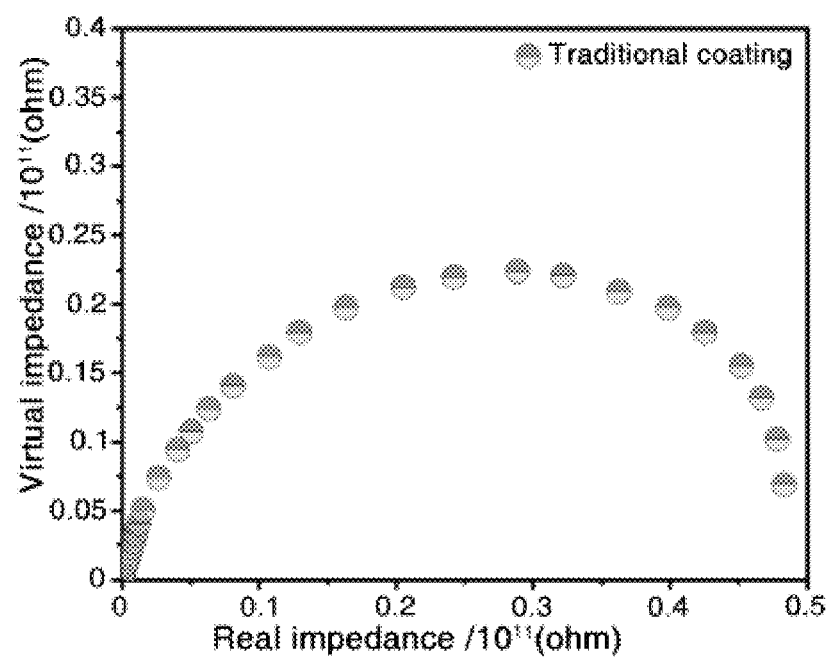
FIG. 6c is a Nyquist electrochemical impedance spectrum of an epoxy coating prepared in Comparative Example 1.

The epoxy coatings prepared in Example 1 and Comparative Example 1 were tested for electrochemical impedance spectrum using Gammay reference 3000 (Gamry, USA). In which, an applied voltage was 10 mV, and a scanning frequency was $10^5$-$10^{-2}$ Hz. A whole test process was carried out in a three-electrode system with Ag/AgCl (saturated KCl solution) electrode as a reference electrode, a platinum sheet as a counter electrode, and a coating system based on a carbon steel as a working electrode. A 3.5 wt % NaCl solution was used as an electrolyte to simulate a typical corrosion environment. For the Nyquist diagram, an arc radius was larger, a corrosion resistance was stronger. As shown in FIG. 6, the impedance of the coating prepared by the method of the present disclosure were comparable to that of the conventional cured coating (the impedance of each coating can reach to $10^{10}$ ohm). In addition, the test results of Example 2 and Example 3 were consistent with Example 1.

(6) Surface Young's Modulus Test

Figure 7:
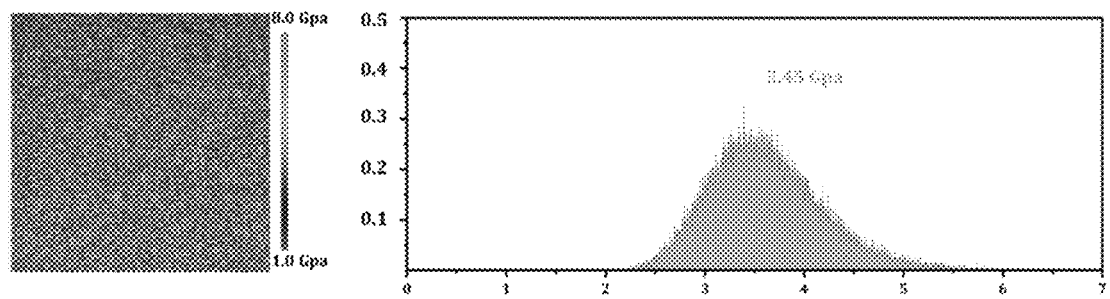
FIG. 7 illustrate a Young's modulus test result of a surface of the epoxy coating according to an embodiment of the present disclosure.

The epoxy coatings were tested for the surface Young's modulus by an atomic force microscope. A high-resolution Young's modulus distribution map was obtained using a standard Bruker probe with a high-hardness single-crystal silicon tip. In which, a resonance frequency of a cantilever beam (Φ=5 nm) was 300 kHz, an oscillation frequency of a z-piezoelectric crystal was 2 kHz, and the Young's modulus distribution was determined by an interaction force curve between the probe and the coating surface. A load variation range was 0.3-0.85 μN. As shown in FIG. 7, the largest surface modulus distribution of the coating of the present disclosure reached 3.45 Gpa, which indicated that the coating of the present disclosure was suitable for most application environments.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A method of preparing a modification-free, recyclable and photothermally-driven self-repairing epoxy anticorrosion coating, comprising:
    (S1) mixing a bisphenol A epoxy resin monomer with an anhydride curing agent uniformly under stirring to obtain a reaction solution;
    (S2) dispersing a photothermal filler uniformly in the reaction solution obtained in step (S1) to obtain a casting solution; wherein the photothermal filler is selected from the group consisting of carbon particle, amorphous carbon, graphite, carbon nanotube, graphene, graphene-derived material, allotrope thereof and a combination thereof; and
    (S3) coating the casting solution onto a substrate followed by curing in a temperature range of 110-130° C. for 4-12 h and cooling to obtain the modification-free, recyclable and photothermally-driven self-repairing epoxy anticorrosion coating, wherein within the temperature range of 110-130° C., a curing time is accordingly shortened by 2 h with respect to every 5° C. increase in temperature; under such curing condition, only a chain growth reaction between the bisphenol A epoxy resin monomer and the anhydride curing agent occurs in an epoxy-anhydride system, and chains are entangled with each other instead of cross-linking.

2. The method of claim 1, wherein the bisphenol A epoxy resin monomer has an epoxy value of 0.38-0.56.

3. The method of claim 2, wherein the bisphenol A type epoxy resin monomer is epoxy resin E54, epoxy resin E51, epoxy resin E44 or epoxy resin E42.

4. The method of claim 1, wherein the anhydride curing agent is maleic anhydride, tung oil anhydride, alkenyl succinic anhydride, tetrahydrophthalic anhydride, hexahydrophthalic anhydride, methyl tetrahydrophthalic anhydride, methyl hexahydrophthalic anhydride, nadic anhydride, methyl nadic anhydride, glutaric anhydride, terpene anhydride, methylcyclohexene tetracarboxylic dianhydride, or dodecenyl succinic anhydride.

5. The method of claim 1, wherein a weight ratio of the anhydride curing agent to the bisphenol A epoxy resin monomer is (0.5-1.1):1.

6. The method of claim 1, wherein the photothermal filler is 1-6% by weight of a total weight of the bisphenol A epoxy resin monomer and the anhydride curing agent.

7. The method of claim 1, wherein the coating in step (S3) is performed by preheated spraying, brushing, pouring or dip coating.

8. The method of claim 1, wherein in step (S1), the stirring is performed for 1-2 h; and a vacuum degassing process is performed for 0.5-1 h after the stirring.

* * * * *